United States Patent
Lejeune

(10) Patent No.: US 12,257,862 B2
(45) Date of Patent: Mar. 25, 2025

(54) MOTORCYCLE TIRE

(71) Applicant: COMPAGNIE GENERALE DES ETABLISSEMENTS MICHELIN, Clermont-Ferrand (FR)

(72) Inventor: Jonathan Lejeune, Clermont-Ferrand (FR)

(73) Assignee: COMPAGNIE GENERALE DES ETABLISSEMENTS MICHELIN, Clermont Ferrand (FR)

( * ) Notice: Subject to any disclaimer, the term of this patent is extended or adjusted under 35 U.S.C. 154(b) by 355 days.

(21) Appl. No.: 17/415,421

(22) PCT Filed: Dec. 13, 2019

(86) PCT No.: PCT/FR2019/053054
§ 371 (c)(1),
(2) Date: Jun. 17, 2021

(87) PCT Pub. No.: WO2020/128251
PCT Pub. Date: Jun. 25, 2020

(65) Prior Publication Data
US 2022/0063346 A1    Mar. 3, 2022

(30) Foreign Application Priority Data
Dec. 18, 2018 (FR) ........................... 1873222

(51) Int. Cl.
*B60C 11/117*    (2006.01)
*B60C 11/03*    (2006.01)
*B60C 11/24*    (2006.01)

(52) U.S. Cl.
CPC ............ *B60C 11/24* (2013.01); *B60C 11/032* (2013.01); *B60C 2200/10* (2013.01)

(58) Field of Classification Search
CPC .............................. B60C 11/24; B60C 11/032
See application file for complete search history.

(56) References Cited

U.S. PATENT DOCUMENTS 3,645,313 A * 2/1972 Roberts ................. B60C 11/032
                                                                  152/325
5,027,876 A * 7/1991 Chrobak ................ B60C 13/003
                                                       152/209.16

(Continued)

FOREIGN PATENT DOCUMENTS

DE    3411667 A * 11/1984 ............ B60C 11/00
EP    3 369 590     9/2018

(Continued)

OTHER PUBLICATIONS

Machine translation for Japan 2007-283803 (Year: 2023).*
Machine translation for Japan 2006-232152 (Year: 2023).*
Machine translation for DE 3,411,667 (Year: 2024).*

*Primary Examiner* — Steven D Maki
(74) *Attorney, Agent, or Firm* — Cozen O'Connor

(57) ABSTRACT

A tire for two-wheeled motorized vehicle having tread connected by sidewalls to beads, each having circumferential reinforcing bead wire, each contacting a rim on which the tire is mounted, the tire has an indicator system of a plurality of cavities formed on tread surface, each cavity having maximum depth less than 1 mm and average width of less than 3 mm, and arranged in a plurality of circumferential sets of cavities) representing different camber angles of the tire, each circumferential set having plurality of cavities arranged in circular arc, wherein two adjacent cavities are spaced along circular arc by circumferential pitch (Pc) between 1 mm and 10 mm, the circumferential sets arranged in specific radial pattern defined by a radial pitch (Pr) corresponding to spacing in radial direction between circular arcs of two adjacent circumferential sets of cavities, the radial pitch (Pr) being between 1 mm and 10 mm.

21 Claims, 6 Drawing Sheets

(56) References Cited

U.S. PATENT DOCUMENTS

| | | |
|---|---|---|
| 2010/0282387 A1 | 11/2010 | Wenzel |
| 2014/0116591 A1* | 5/2014 | Kurashina ............ B60C 11/0302 |
| | | 152/209.28 |
| 2018/0319218 A1* | 11/2018 | Tokitoh ............... B60C 11/1236 |

FOREIGN PATENT DOCUMENTS

| | | | |
|---|---|---|---|
| FR | 3 060 457 | | 6/2018 |
| JP | 2006-232152 A | * | 9/2006 |
| JP | 2007-283803 A | * | 11/2007 |

\* cited by examiner

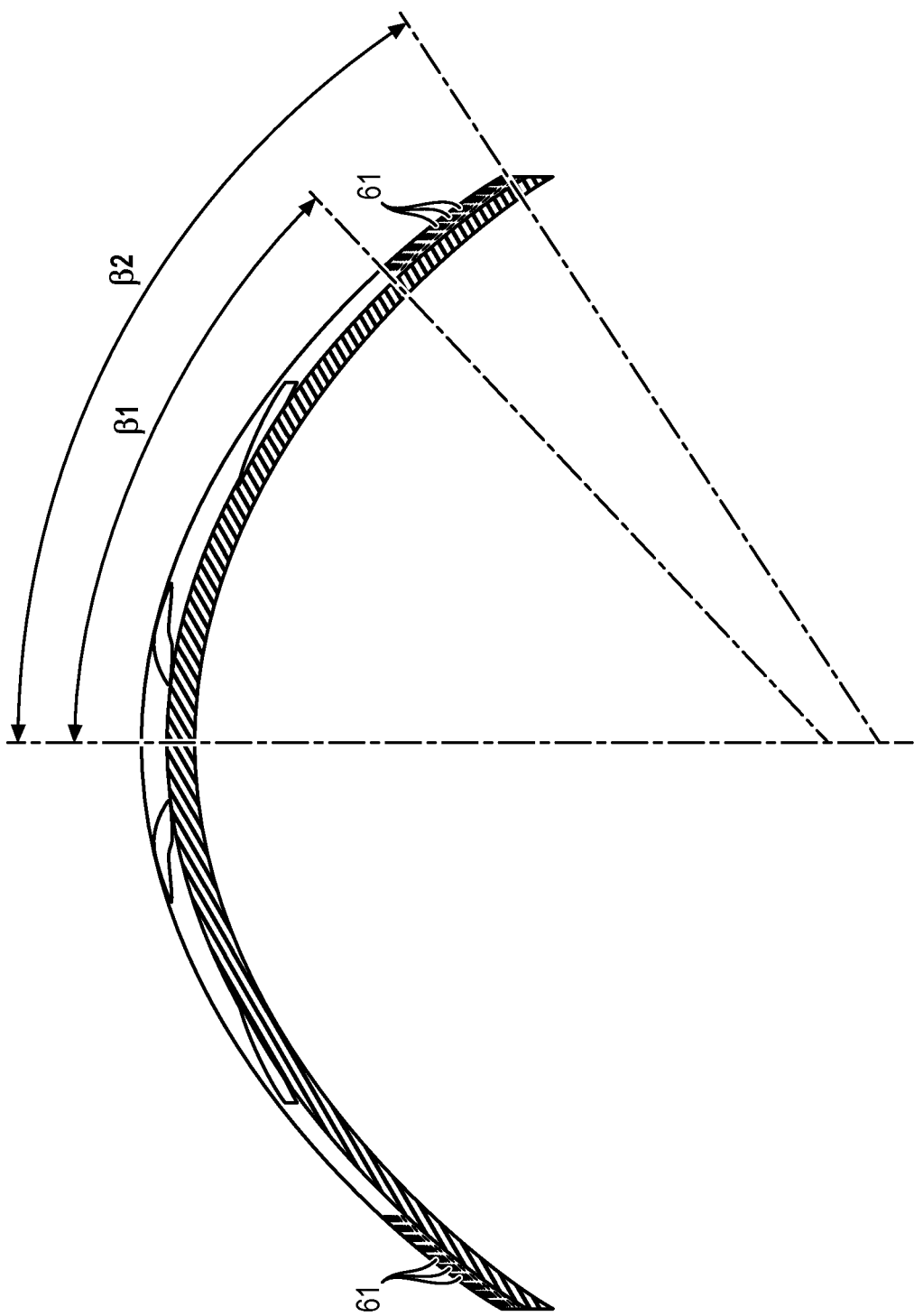

MOTORCYCLE TIRE

RELATED APPLICATIONS

This is a U.S. National Phase Application under 35 USC 371 of International Application PCT/FR2019/053054 filed on Dec. 13, 2019.

This application claims the priority of French application nos. FR 18/73222 filed Dec. 18, 2018, the entire content of all of which are hereby incorporated by reference.

FIELD OF THE INVENTION

The invention relates to a tire intended to be fitted to a two-wheeled motorized vehicle of the motorcycle type.

BACKGROUND OF THE INVENTION

When a new tire is installed on a vehicle, a period of running-in is always necessary so that said tire is in its optimum conditions of use, both in terms of coupling with respect to the vehicle and also in terms of structure, in particular of rubber.

A tire for a two-wheeled motorized vehicle is therefore no exception to this running-in principle, with an additional constraint residing in the specific use of the tire depending on the camber angle adopted by the driver. This is because the tread of a tire for a two-wheeled motorized vehicle will be stressed differently depending on the angle adopted by the driver, and this involves running-in that may differ depending on the camber angle.

In order to help the user to know the running-in condition of his or her tire, it has been possible to propose tires that have an indicator system on the tread, for example a longitudinal groove along a meridian of the tire. However, such a solution is not satisfactory since it does not give an indication regardless of the positioning of the tire with respect to the vehicle, and it can also generate irregular and abnormal forms of wear.

Another concern of the driver during the running-in phase relates to safety, and he or she may in particular be concerned about the grip of the tire, which is not optimal in this initial phase of use of the tire.

In patent application US 2010/282387, it has been proposed to form a micrometric roughness on the surface of the tread so as to increase the contact surface and therefore the grip of the tire during the first uses of the tire. However, such a solution remains relatively unsatisfactory since it only works for the first kilometres travelled, and therefore not necessarily throughout the tire running-in phase. In addition, the driver still does not have a clear indication of the use of his or her tire over the entire tread.

In view of the above, there is therefore a need for a tire for a two-wheeled motorized vehicle, of the motorcycle type, which has improved use during the running-in phase of said tire, in particular the first 200 kilometres of use, having a system allowing the user to know the use and/or running-in condition of the tire while at the same time guaranteeing increased grip compared with a standard tire in the running-in phase.

SUMMARY OF THE INVENTION

To this end, a tire for a two-wheeled motorized vehicle, of the motorcycle type, is proposed, comprising a tread that is connected by two sidewalls to two beads, each bead comprising a circumferential reinforcing bead wire, said beads being intended to come into contact with a rim on which the tire is intended to be mounted, the tire comprising an indicator system that comprises a plurality of cavities formed on the surface of the tread, each cavity having a maximum depth of less than 1 mm and an average width of less than 3 mm, the cavities being arranged in a plurality of circumferential sets of cavities that represent different camber angles of the tire, each circumferential set of cavities comprising a plurality of cavities that are arranged in a circular arc, in which two adjacent cavities are spaced apart along the circular arc by a circumferential pitch (Pc) of between 1 mm and 10 mm, the various circumferential sets of cavities being arranged in a specific radial pattern, the radial pattern being defined by a radial pitch that corresponds to the spacing in the radial direction between the circular arcs of two adjacent circumferential sets of cavities, the radial pitch (Pr) being between 1 mm and 10 mm.

Preferred but non-limiting aspects of this tire, taken individually or in combination, are as follows:

- the various circumferential sets of cavities of the indicator system are distributed over the tread on either side of the equatorial plane of the tire in an angular camber region between a camber angle on the tire of 0° and a camber angle on the tire of at least 40°.
- the circumferential sets of cavities of the indicator system are distributed over the tread of the tire on either side of the equatorial plane of the tire in an angular camber region over an angular camber sector of at least 10°, preferably over an angular camber sector of at least 15°, and more preferably over an angular camber sector of at least 20°.
- the circumferential sets of cavities of the indicator system are distributed over the entire tread of the tire.
- the circumferential sets of cavities of the indicator system are distributed over the tread of the tire on either side of the equatorial plane of the tire in an angular camber region between a camber angle on the tire of 30° and a camber angle on the tire of 60°, preferably between a camber angle on the tire of 40° and a camber angle on the tire of 58°, and more preferably between a camber angle on the tire of 48° and a camber angle on the tire of 58°.
- two adjacent circumferential sets of cavities are separated radially by an angular camber sector of 1°.
- the cavities of two adjacent circumferential sets of cavities have different depths and/or average widths, with values of between 0.1 mm and 1 mm, and preferably between 0.2 mm and 0.5 mm.
- the cavities of the circumferential sets of cavities have depths and/or average widths that increase with the corresponding positioning of the tire camber angle.
- the cavities of the circumferential sets of cavities have depths and/or average widths that increase with the corresponding positioning of the tire camber angle, from a value of 0.2 mm to a value of 1 mm.
- the cavities of the indicator system are arranged such that the adjacent cavities of two adjacent circumferential sets of cavities are aligned in one and the same radial direction.
- the cavities of the indicator system are arranged such that the adjacent cavities of two adjacent circumferential sets of cavities are offset, not aligned in one and the same radial direction.

each cavity is a blind hole having a section with a shape chosen from among a circular section, a polygonal section, a star-shaped section, and an oval section.

the section of a cavity varies in the depth of the cavity.

the cavities have a partially spherical shape, preferably a hemispherical shape.

the cavities of two adjacent circumferential sets of cavities have different shapes and/or dimensions.

the tread further comprises a plurality of substantially longitudinal notches positioned on either side of the equatorial plane of the tire.

BRIEF DESCRIPTION OF THE FIGURES

Further features and advantages of the invention will become more apparent from the following description, which is purely illustrative and non-limiting and should be read in conjunction with the appended drawings, in which:

FIG. 8 is a view in radial section of the tread of the tire according to the third embodiment of the invention, illustrating the angular distribution of the corresponding indicator system.

DETAILED DESCRIPTION OF THE FIGURES

Figure 1:
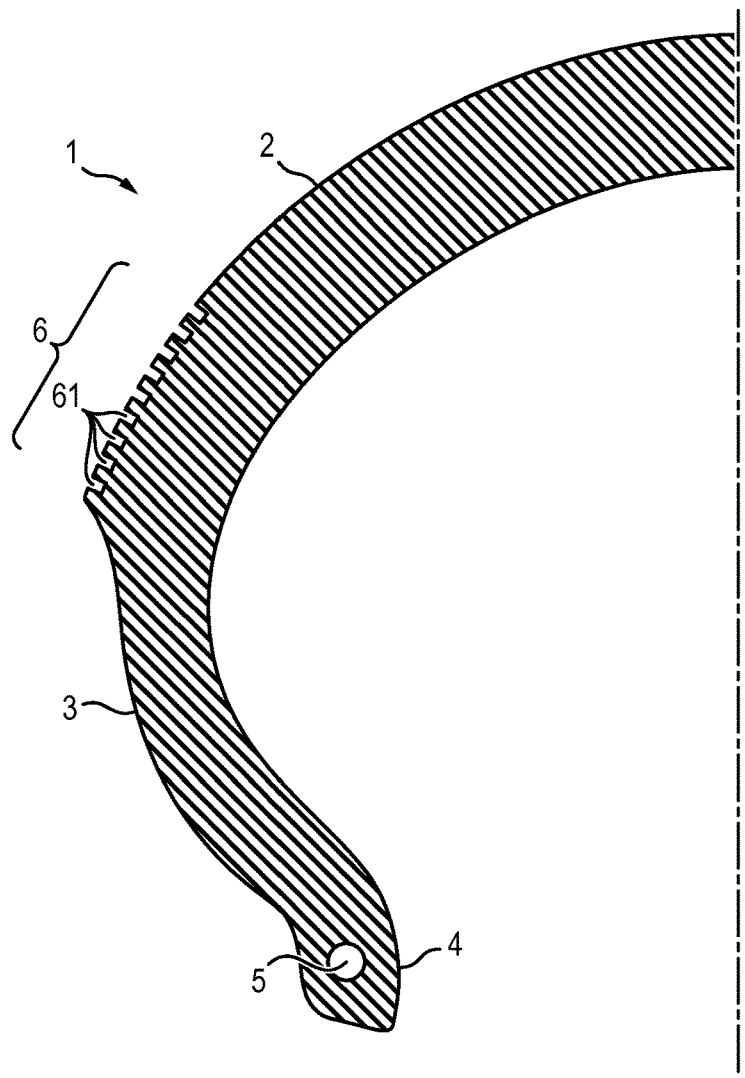
FIG. 1 is a meridian section through a tire for a two-wheeled motorized vehicle, having an indicator system according to the invention.

In this document, "tread surface" means all of the points of the tread of a tire that are likely to come into contact with the ground when the tire is being driven on.

When using the term "radial", a distinction should be made between several different uses of the word by a person skilled in the art.

Firstly, the expression refers to a radius of the tire. A "radial direction" is a direction that intersects the axis of rotation of the tire and is perpendicular thereto. It is within this meaning that a point P1 is said to be "radially inside" a point P2 (or "radially on the inside" of the point P2) if it is closer to the axis of rotation of the tire than the point P2. Conversely, a point P3 is said to be "radially outside" a point P4 (or "radially on the outside" of the point P4) if it is further away from the axis of rotation of the tire than the point P4. Progress will be said to be "radially inwards (or outwards)" when it is in the direction of the smaller (or larger) radii. This sense of the term also applies when it is a matter of radial distances. In addition, the radius Rx from a point X of the tire is the radial distance between the axis of rotation of said tire and the point X.

Conversely, a thread or a reinforcement is said to be "radial" when the thread or the reinforcing elements of the reinforcement make an angle greater than or equal to 80° and less than or equal to 90° with the circumferential direction.

Note that, in this document, the term "thread" should be understood in a very general sense and comprises threads in the form of monofilaments, multifilaments, a cord, a folded yarn or an equivalent assembly, irrespective of the material making up the thread or the surface treatment promoting its bonding with the rubber.

Finally, a "radial cross section" or "radial section" means here a cross section or a section in a plane that contains the axis of rotation of the tire. A "radial or meridian plane" is a plane that contains the axis of rotation of the tire.

An "axial" direction is a direction parallel to the axis of rotation of the tire. A point P5 is said to be "axially inside" a point P6 (or "axially on the inside" of the point P6) if it is closer to the median plane of the tire than the point P6. Conversely, a point P7 is said to be "axially outside" a point P8 (or "axially on the outside" of the point P8) if it is further away from the median plane of the tire than the point P8.

The "median plane or equatorial plane" of the tire is the plane that is perpendicular to the axis of rotation of the tire and is equidistant from the annular reinforcing structures of each bead. This plane divides the tire into two substantially equal halves, i.e. passes through the middle of the tread.

A "circumferential direction" is a direction that is perpendicular both to a radius of the tire and to the axial direction. This corresponds to the direction in which the tire runs.

A "circumferential cross section" or "circumferential section" is respectively a cross section or a section in a plane perpendicular to the axis of rotation of the tire. A "circumferential plane" is a plane perpendicular to the axis of rotation of the tire.

The camber angle with the ground is defined on a meridian section through the tire as the angle formed by the equatorial plane of the tire with the direction perpendicular to the ground passing through the point of contact between the tire and the ground. A zero camber angle corresponds to a position in which the tire is perpendicular to the ground, i.e. the perpendicular to the ground is in the equatorial plane of the tire. By extension, the camber angle on the tire is defined on a meridian section through the tire as the angle formed between the equatorial plane of the tire and the direction perpendicular to the direction tangent to the surface of the tire passing through the rolling point of the tire that is intended to be in contact with the ground for a given camber, i.e. the point passing through the rolling line of the tire for a given camber.

In order to make the description of the variants shown in the figures easier to read, the same references are used to denote identical structural elements.

FIG. 1 is a section through a tire 1 for a two-wheeled motorized vehicle, of the motorcycle type, comprising a tread 2 that is connected by two sidewalls 3 to two beads 4.

Each bead 4 comprises a circumferential reinforcing bead wire 5, the beads 4 being intended to come into contact with a rim on which the tire 1 is intended to be mounted.

It should be noted that the tire 1 also generally comprises a carcass structure (not shown), this carcass structure comprising one or more carcass plies that are specifically arranged.

The tire 1 also comprises, according to the invention, an indicator system 6 that is made up of a plurality of cavities 61 formed on the surface of the tread 1. As will be seen below, this indicator system (6) can be used to provide information on the camber of the tire and/or on the running-in of the tire.

The cavities 61 are preferably arranged so as to be distributed over the entire circumference of the tire, and a certain tread width.

More specifically, the cavities 61 are arranged in a plurality of circumferential sets of cavities (6a; 6b; 6c) that represent different camber angles of the tire 1.

A circumferential set of cavities (6a; 6b; 6c) comprises a plurality of cavities 61 that are arranged in a circular arc, preferably in a circle corresponding to a circumferential direction of the tire, in which two adjacent cavities are spaced apart along the circular arc by a circumferential pitch (Pc), this circumferential pitch (Pc) being non-zero.

The circumferential pitch (Pc) is for example between 1 mm and 10 mm, preferably between 1 mm and 8 mm, more preferably between 4 mm and 6 mm. The circumferential pitch (Pc) is for example of the order of 5 mm.

Furthermore, according to the proposed indicator system 6, the various circumferential sets of cavities (6a; 6b; 6c) are arranged in a specific radial pattern, the radial pattern being defined by a radial pitch (Pr) that corresponds to the spacing in the radial direction between the circular arcs of two adjacent circumferential sets of cavities, the radial pitch (Pr) being for example between 1 mm and 10 mm.

More preferably, the radial pitch (Pr) is between 1 mm and 5 mm, and preferentially between 2 mm and 3 mm. The radial pitch (Pr) is for example of the order of 2.5 mm.

The fact of having circumferential sets of cavities (6a; 6b; 6c) arranged in a specific radial pattern makes it possible to give valuable information to the driver on the use of the tread of the tire used. In particular, the wear of the cavities 61 enables the driver to know whether or not a particular rolling line, which is at a particular tire camber angle, is sufficiently run in. This also naturally provides information on the use of the tire at a particular camber angle.

The radial pattern can for example be provided so that two adjacent circumferential sets of cavities (6a; 6b; 6c) are separated radially by an angular camber sector of 1°. Thus, this makes it possible to precisely mark the camber angles on the tire and to give the driver information that is easy to integrate.

The fact that the cavities 61 are distributed circumferentially allows the driver to obtain information on the camber angle, and therefore on the use of the tire along the corresponding rolling line, regardless of the positioning of the tire with respect to the vehicle.

The fact of providing real cavities 61 for forming the proposed indicator system 6 has the advantage of increasing the grip of the tire, in particular when the cavities 61 are positioned in the running direction. Specifically, the cavities 61 make it possible to increase the edge ratio, and this in fact increases the grip of the tire.

Each cavity 61 therefore has minimum dimensions, for example an average width and a depth of at least 0.1 mm, respectively. The average width and the depth are preferably at least 0.2 mm, respectively.

Each cavity 61 preferably has a maximum average width of less than 3 mm and more preferentially less than 1 mm.

Each cavity 61 also preferably has a maximum depth of less than 1 mm.

Even more preferably, each cavity 61 has an average width and/or a maximum depth of between 0.1 mm and 1 mm, and preferably between 0.2 mm and 0.5 mm.

The cavities 61 of the various circumferential sets of cavities (6a; 6b; 6c) may have an identical shape and identical dimensions.

However, according to another possible embodiment, the cavities 61 of two adjacent circumferential sets of cavities (6a; 6b; 6c) have different depths.

The depth and/or the average width of the cavities 61 of the circumferential sets of cavities (6a; 6b; 6c) can for example increase with the corresponding positioning of the tire camber angle. Such an arrangement is particularly advantageous since it makes it possible to vary the edge ratio, and therefore the grip, depending on the camber angle. In particular, it may be appropriate to have a greater edge ratio depending on whether the camber angle is high, since it is in particular in these situations of high camber angle that the driver needs to be reassured about the grip of his or her tire during the running-in phase.

According to a specific example, the depth and/or the average width of the cavities 61 of the circumferential sets of cavities (6a; 6b; 6c) increase with the corresponding positioning of the tire camber angle, from a value of 0.2 mm to a value of 1 mm, and preferably from a value of 0.2 mm to a value of 0.5 mm.

Each cavity 61 is a blind hole having a section with a shape chosen, for example, from among a circular section, a polygonal section, a star-shaped section, and an oval section. This section can vary or be constant depending on the depth of the cavity 61.

Figure 2:
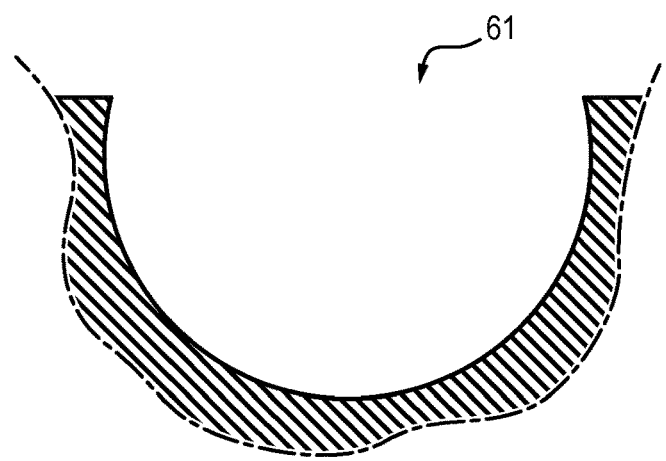
FIG. 2 is a schematic depiction in radial section of a cavity of an indicator system according to the invention.

The exemplary cavity 61 illustrated in FIG. 2 corresponds to a cavity 61 of partially spherical shape, close to a hemisphere.

The radial pattern of the circumferential sets of cavities (6a; 6b; 6c) forming the indicator system 6 can be varied.

The circumferential sets of cavities (6a; 6b; 6c) of the indicator system (6) can be distributed over the tread 2 of the tire 1 on either side of the equatorial plane of the tire 1 in an angular camber region over an angular camber sector of at least 10°, preferably over an angular camber sector of at least 15°, and more preferably over an angular camber sector of at least 20°.

The various circumferential sets of cavities (6a; 6b; 6c) of the indicator system (6) can be distributed over the tread 2 on either side of the equatorial plane of the tire 1 in an angular camber region between a camber angle on the tire of 0° and a camber angle on the tire of at least 40°.

Figure 3:
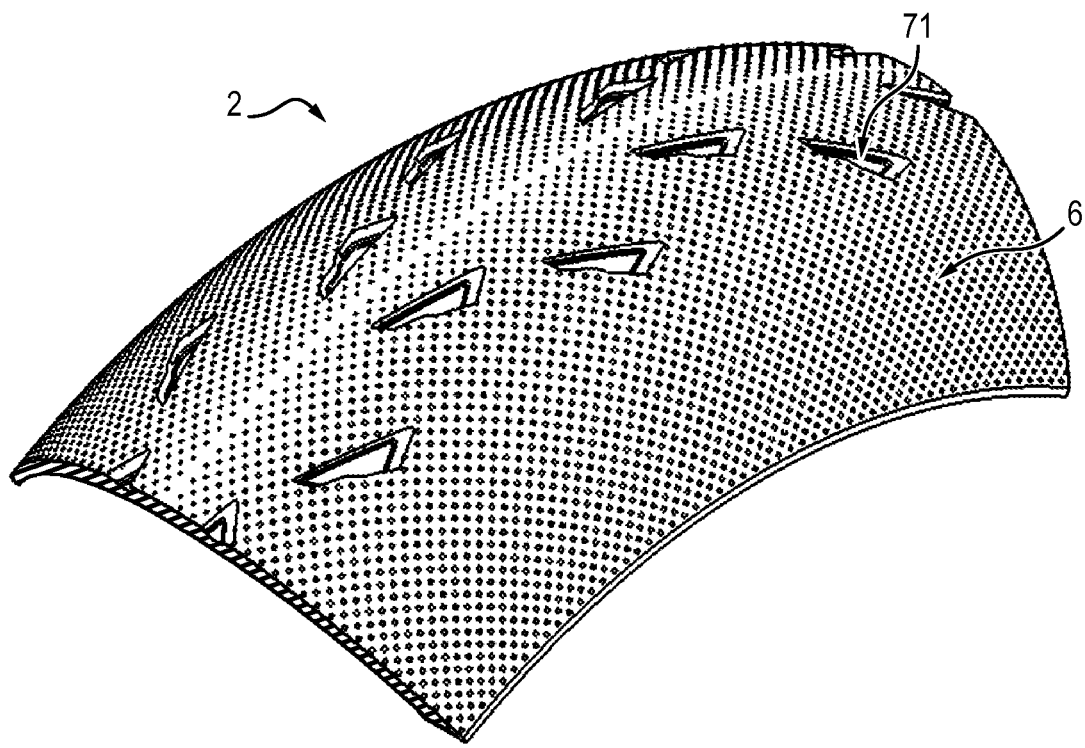
FIG. 3 is a three-dimensional depiction of a tread of a tire according to a first embodiment of the invention.

As shown in FIG. 3, the circumferential sets of cavities (6a; 6b; 6c) can are preferably distributed over the entire tread 2 of the tire 1. This makes it possible to have a precise indication of the camber adopted by the tire over the whole tread.

The running-in of a tire is, however, relatively quick and not very risky in terms of grip with regard to the central region of the tread that is positioned on either side of the equatorial plane of the tire. This is less true for the regions of the tread in the shoulder region, i.e. close to the join with the sidewall of the tire. This is because these regions correspond to these high camber angles and therefore regions of the tire that are much less highly stressed. In addition, they correspond to regions in which the risk of loss of grip is increased and in which the tire absolutely has to play its role in order to ensure the required grip.

Thus, it could be provided to distribute the circumferential sets of cavities (6a; 6b; 6c) over the tread 2 of the tire 1 only in the shoulder regions, for example an angular camber region between a camber angle on the tire of 30° and a camber angle on the tire of 60°.

Preferably, the circumferential sets of cavities (6a; 6b; 6c) are distributed over an angular camber region between a camber angle on the tire of 40° and a camber angle on the tire of 58°, and more preferably between a camber angle on the tire of 48° and a camber angle on the tire of 58°.

Figure 4:
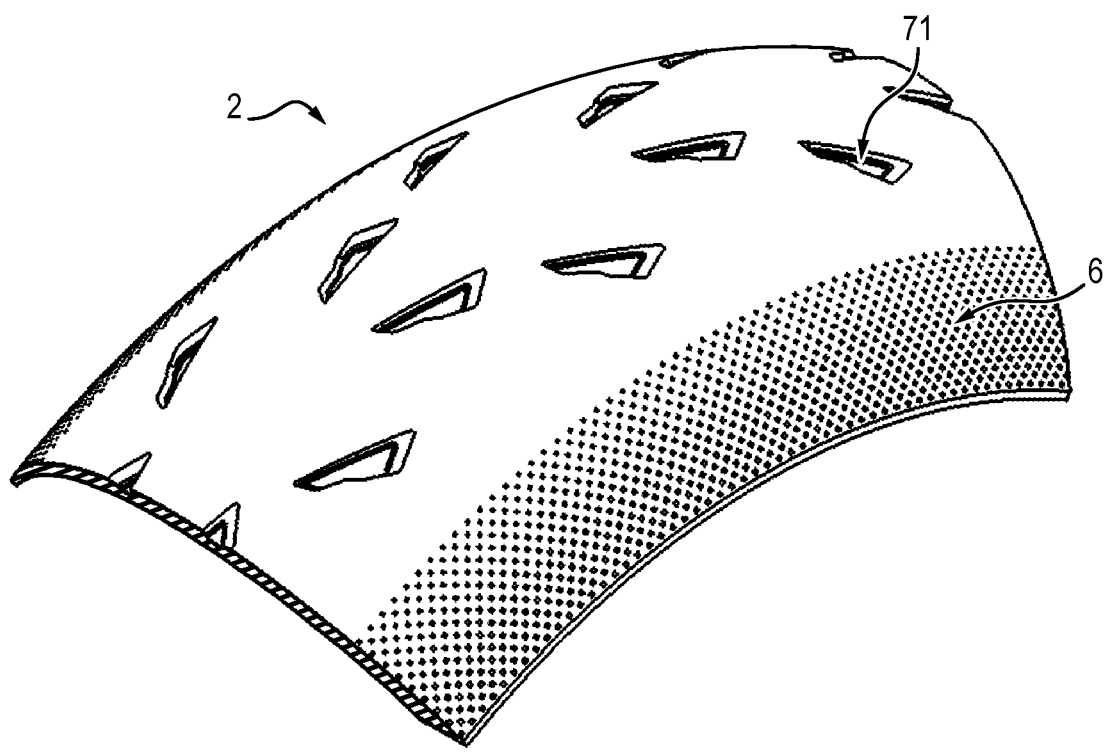
FIG. 4 is a three-dimensional depiction of a tread of a tire according to a second embodiment of the invention.
Figure 5:
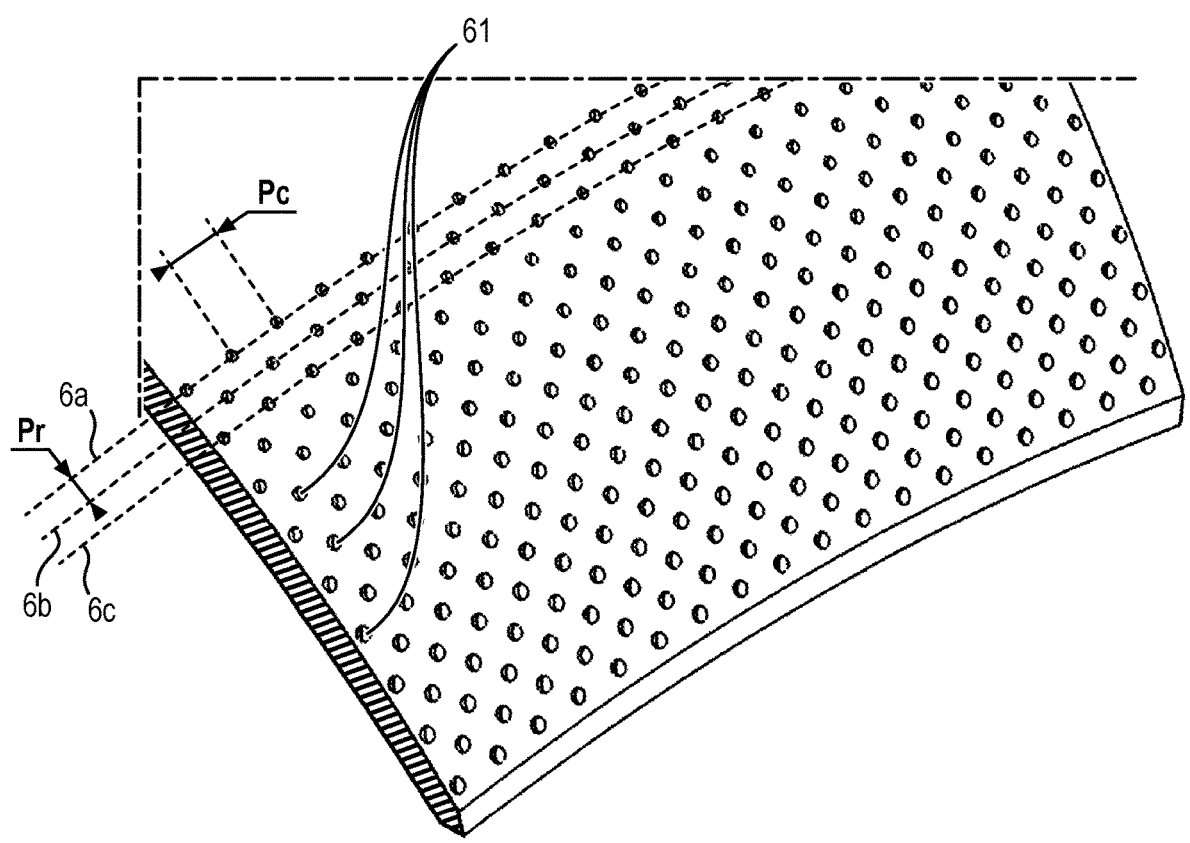
FIG. 5 is an enlarged view of the indicator system of the tire according to the second embodiment of the invention.
Figure 6:
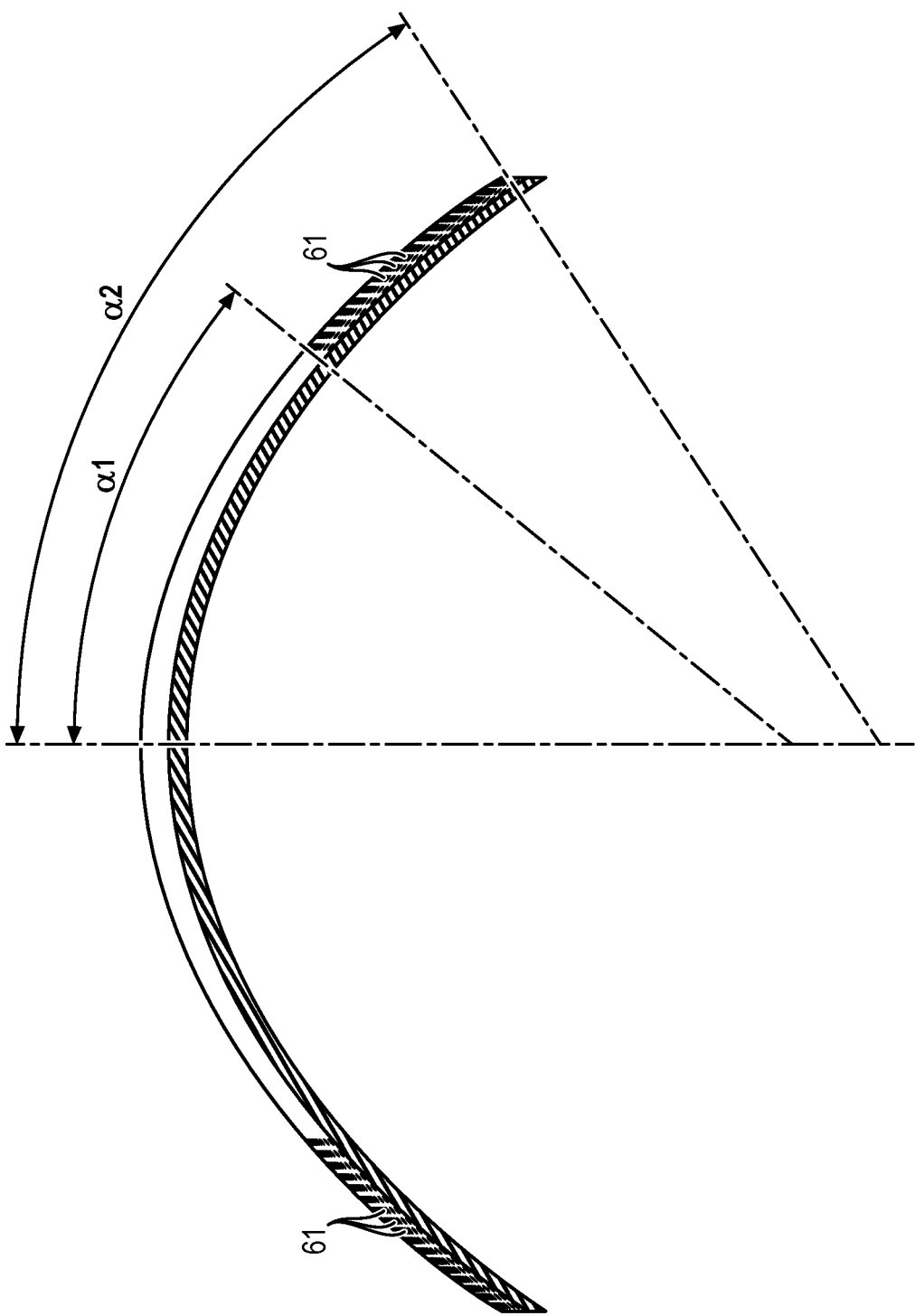
FIG. 6 is a view in radial section of the tread of the tire according to the second embodiment of the invention, illustrating the angular distribution of the corresponding indicator system.

FIGS. 4 to 6 illustrate such an arrangement in the shoulder region according to a first specific exemplary embodiment in which the cavities 61 are distributed between a camber angle on the tire (α1) of approximately 40° and a camber angle on the tire (α2) of approximately 58°.

The indicator system 6 according to this first exemplary embodiment comprises 17 circumferential sets of cavities, in which two adjacent circumferential sets of cavities are spaced apart by a camber angle of approximately 1°. The corresponding radial pitch (Pr) is of the order of 2.5 mm.

According to this first exemplary embodiment, the cavities 61 have a shape corresponding to a portion of a sphere, with a maximum width of approximately 1.5 mm at the surface of the tread (i.e. a radius of 0.75 mm) and a variable depth between the two extreme positions of the shoulder region, of between 0.2 mm on the side of the centre of the tire and 0.5 mm on the side of the sidewall. The circumferential pitch (Pc) between two cavities 61 of a single circumferential set of cavities is, according to this example, of the order of 5 mm.

As is apparent in FIG. 5, the adjacent cavities 61 of two adjacent circumferential sets of cavities (6a; 6b; 6c) are offset, not aligned in one and the same radial direction.

It could however be provided that the indicator system 6 is formed such that the adjacent cavities 61 of two adjacent circumferential sets of cavities (6a; 6b; 6c) are aligned in one and the same radial direction.

Figure 7:
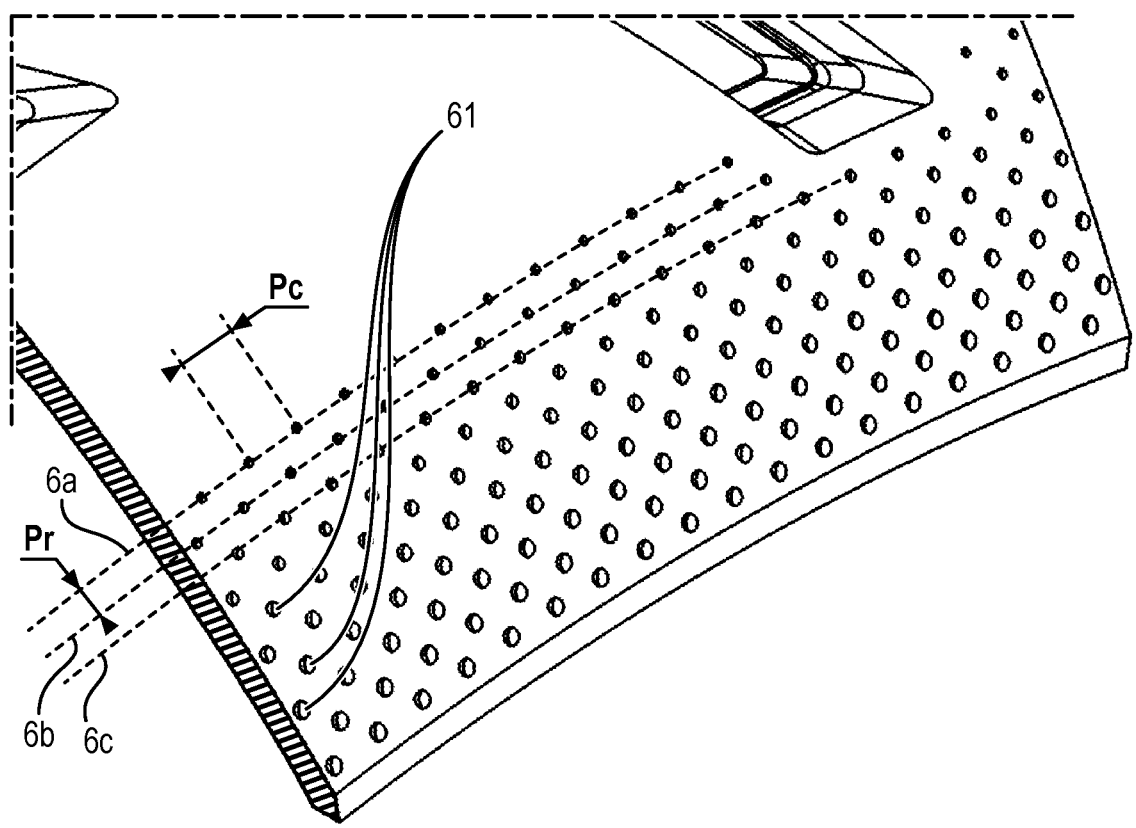
FIG. 7 is an enlarged view of the indicator system of a tire according to a third embodiment of the invention.

FIGS. 7 and 8 illustrate an arrangement in the shoulder region according to a second specific exemplary embodiment in which the cavities 61 are distributed between a camber angle on the tire (β1) of approximately 48° and a camber angle on the tire (β2) of approximately 58°.

The indicator system 6 according to this second exemplary embodiment comprises 10 circumferential sets of cavities, in which two adjacent circumferential sets of cavities are spaced apart by a camber angle of approximately 1°. The corresponding radial pitch (Pr) is of the order of 1.2 mm.

According to this second exemplary embodiment, the cavities 61 also have a substantially hemispherical shape, with a width of approximately 1.5 mm (i.e. a circular section at the surface of the tread having a radius of 0.75 mm) and a variable depth between the two ends of the positioning shoulder region, of between 0.2 mm and 0.5 mm on the side of the sidewall. The circumferential pitch (Pc) between two cavities 61 of a single circumferential set of cavities is, according to this example, also of the order of 2.5 mm.

The tire presented here can advantageously have a tread 2 further comprising a plurality of substantially longitudinal notches 71 positioned on either side of the equatorial plane of the tire 1. These notches can have a role of evacuating water throughout the duration of the use of the tire and therefore well beyond the running-in phase.

Such an arrangement of longitudinal notches 71 complementing the proposed indicator system is particularly advantageous when the cavities 61 of the indicator system 6 are only positioned on the shoulder regions of the tire, since these notches 71 improve the grip of the tire in the equatorial region during the running-in phase.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a two-wheeled motorized vehicle, of a motorcycle type, comprising a tread that is connected by two sidewalls to two beads, each bead comprising a circumferential reinforcing bead wire, said beads being intended to come into contact with a rim on which the tire is intended to be mounted,
   the tire comprising an indicator system that comprises a plurality of cavities formed on the surface of the tread, each cavity having a maximum depth of less than 1 mm and an average width of less than 3 mm,
   the cavities being arranged in a plurality of circumferential sets of cavities, wherein each circumferential set of cavities represents a different camber angle of the tire,
   each circumferential set of cavities comprising a plurality of cavities that are distributed circumferentially in a circular arc, wherein two adjacent cavities are spaced apart along the circular arc by a circumferential pitch of between 1 mm and 10 mm,
   the circumferential sets of cavities being arranged in a specific radial pattern, the radial pattern being defined by a radial pitch that corresponds to the spacing in the radial direction between the circular arcs of two adjacent circumferential sets of cavities, the radial pitch being between 1 mm and 10 mm,
   wherein the cavities of the circumferential sets of cavities have depths and/or average widths that increase with a corresponding positioning of a tire camber angle; and
   wherein two adjacent cavities are spaced apart along the circular arc by a circumferential pitch of between 1 mm and 8 mm.

2. The tire of claim 1, wherein the circumferential sets of cavities of the indicator system are distributed over the tread on either side of the equatorial plane of the tire in an angular camber region between a camber angle on the tire of 0° and a camber angle on the tire of at least 40°.

3. The tire of claim 1, wherein the circumferential sets of cavities of the indicator system are distributed over the tread of the tire on either side of the equatorial plane of the tire in an angular camber region over an angular camber sector of at least 10°.

4. The tire of claim 1, wherein the circumferential sets of cavities of the indicator system are distributed over the entire tread of the tire.

5. The tire of claim 1, wherein the circumferential sets of cavities of the indicator system are distributed over the tread of the tire on either side of the equatorial plane of the tire in an angular camber region between a camber angle on the tire of 30° and a camber angle on the tire of 60°.

6. The tire of claim 1, wherein two adjacent circumferential sets of cavities are separated radially by an angular camber sector of 1°.

7. The tire of claim 1, wherein the cavities of two adjacent circumferential sets of cavities have different depths and/or average widths, with values of between 0.1 mm and 1 mm.

8. The tire of claim 1, wherein the cavities of the circumferential sets of cavities have depths and/or average widths that increase with a corresponding positioning of a tire camber angle, from a value of 0.2 mm to a value of 1 mm.

9. The tire of claim 1, wherein the cavities of the indicator system are arranged such that the adjacent cavities of two adjacent circumferential sets of cavities are aligned in one and the same radial direction.

10. The tire of claim 1, wherein each cavity is a blind hole having a section with a shape chosen from among a circular section, a polygonal section, a star-shaped section, and an oval section.

11. The tire of claim 10, wherein the section of a cavity varies in the depth of the cavity.

12. The tire of claim 1, wherein the cavities have a partially spherical shape.

13. The tire of claim 1, wherein the cavities of two adjacent circumferential sets of cavities have different shapes and/or dimensions.

14. The tire of claim 1, wherein the tread further comprises a plurality of substantially longitudinal notches positioned on either side of the equatorial plane of the tire.

15. The tire of claim 1, wherein the circumferential sets of cavities of the indicator system are distributed over the tread of the tire on either side of the equatorial plane of the tire in an angular camber region over an angular camber sector of at least 15°.

16. The tire of claim 1, wherein the circumferential sets of cavities of the indicator system are distributed over the tread of the tire on either side of the equatorial plane of the tire in an angular camber region over an angular camber sector of at least 20°.

17. The tire of claim 1, wherein the circumferential sets of cavities of the indicator system are distributed over the tread of the tire on either side of the equatorial plane of the tire in an angular camber region between a camber angle on the tire of 40° and a camber angle on the tire of 58°.

18. The tire of claim 1, wherein the circumferential sets of cavities of the indicator system are distributed over the tread of the tire on either side of the equatorial plane of the tire in an angular camber region between a camber angle on the tire of 48° and a camber angle on the tire of 58°.

19. The tire of claim 1, wherein the cavities of two adjacent circumferential sets of cavities have different depths and/or average widths, with values of between 0.2 mm and 0.5 mm.

20. The tire of claim 1, wherein the cavities have a hemispherical shape.

21. A tire for a two-wheeled motorized vehicle, of a motorcycle type, comprising a tread that is connected by two sidewalls to two beads, each bead comprising a circumferential reinforcing bead wire, said beads being intended to come into contact with a rim on which the tire is intended to be mounted, the tire comprising an indicator system that comprises a plurality of cavities formed on the surface of the tread, each cavity having a maximum depth of less than 1 mm and an average width of less than 3 mm, the cavities being arranged in a plurality of circumferential sets of cavities distributed over the tread of the tire on either side of the equatorial plane of the tire in an angular camber region between a camber angle on the tire of 30° and a camber angle on the tire of 60°, wherein each circumferential set of cavities represents a different camber angle of the tire, each circumferential set of cavities comprising a plurality of cavities that are distributed circumferentially in a circular arc, wherein two adjacent cavities are spaced apart along the circular arc by a circumferential pitch, wherein the cavities of two adjacent circumferential sets of cavities are arranged in a specific radial pattern offset and not aligned in the radial direction with each other, the radial pattern being defined by a radial pitch that corresponds to the spacing in the radial direction between the circular arcs of two adjacent circumferential sets of cavities, the radial pitch being between 1 mm and 10 mm; and wherein two adjacent cavities are spaced apart along the circular arc by a circumferential pitch of between 1 mm and 8 mm.

* * * * *